(12) United States Patent
McGuire et al.

(10) Patent No.: US 8,301,022 B1
(45) Date of Patent: Oct. 30, 2012

(54) IMAGE CAPTURE DEVICE WITH BOOTH

(75) Inventors: Jonathan G. McGuire, Seattle, WA (US); Jon D. Mittelstaedt, Burien, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

(21) Appl. No.: 12/965,561

(22) Filed: Dec. 10, 2010

(51) Int. Cl.
*G03B 15/00* (2006.01)
*G03B 15/02* (2006.01)

(52) U.S. Cl. .......... 396/2; 396/3; 396/4; 396/5
(58) Field of Classification Search ............... 396/1–5; 382/154
See application file for complete search history.

(56) References Cited

U.S. PATENT DOCUMENTS

| | | | |
|---|---|---|---|
| 4,236,795 | A | 12/1980 | Kephart |
| 7,440,685 | B2 | 10/2008 | Weng et al. |
| 2003/0206735 | A1* | 11/2003 | Saigo et al. ............ 396/1 |
| 2004/0047624 | A1 | 3/2004 | Sugiura et al. |
| 2008/0056569 | A1* | 3/2008 | Williams et al. ............ 382/173 |

OTHER PUBLICATIONS http://www.kaidan.com/products/mc60.html, Kaidan Meridian C-60 product order page, Kaidan Incorporated 2001.
http://www.kaidan.com/products/tm400.html, Kaidan Meridian TM-400 product order page, Kaidan Incorporated 2001.
http://www.lobsterpotphoto.co.uk/, Lobsterpot product page, as of Febuary 14, 2010.
U.S. Appl. No. 12/712,999, filed Feb. 25, 2010.

* cited by examiner

*Primary Examiner* — Rochelle-Ann J Blackman
(74) *Attorney, Agent, or Firm* — Robert C. Kowert; Meyertons, Hood, Kivlin, Kowert & Goetzel, P.C.

(57) ABSTRACT

A system for capturing images of an object includes an image capture booth, one or more lights coupled to the image capture booth, a platter coupled to the image capture booth, and a hanger coupled to the image capture booth. The image capture booth includes panels that enclose a space for imaging objects. The lights illuminate at least a portion of the space. The platter and the hanger each support objects for imaging of the objects in the image capture booth.

29 Claims, 9 Drawing Sheets

IMAGE CAPTURE DEVICE WITH BOOTH

BACKGROUND

Consumers who purchase products online or by mail-order often desire to see photographs of a product before purchasing the product. For many personal articles, such as apparel or footwear, the appearance of an article may be a very important consideration in whether or not to purchase the article. In the case of shoes, for example, a customer may wish to see how the shoes look from the sides, the top, and several other directions. One retailer may offer hundreds or even thousands of different articles. Moreover, a retailer's offerings for some types of consumer products may be in a continual state of change, with new items being added continually. For such retailers, acquiring and processing all of the images of interest to its customers may be labor-intensive and expensive.

Some online retailers employ a photographer, or even several photographers, to take photographs of specimens of articles to be offered for sale. Setting up lighting, background, and camera, providing power and data connections, positioning of objects, and taking photographs, as well as the associated handling and tracking of the objects themselves, is likely to require substantial staff time, studio facilities, and other resources. In addition, the photographs taken are likely to vary from photographer to photographer, and, even with the same photographer, from photo shoot to photo shoot and from shot to shot, due to a myriad of variations in object placement, lighting, background, camera position, camera setting choices, etc.

With many imaging systems, when a camera is moved from one position to another to capture different views of an object, the background will change from view to view, as different features of the imaging apparatus (such as rails, platforms, or positioning mechanisms), and/or objects behind the apparatus, appear in the background. Some inconsistencies, anomalies, and other undesired features introduced during a photo shoot can be removed or at least mitigated by post-image acquisition processing techniques. For example, an image may be touched up to remove the edge of a platform. Such post-processing techniques may, however, be expensive and time-consuming to employ, and even when employed may not ultimately achieve the level of article-to-article consistency that is sought by the retailer.

Figure 1:
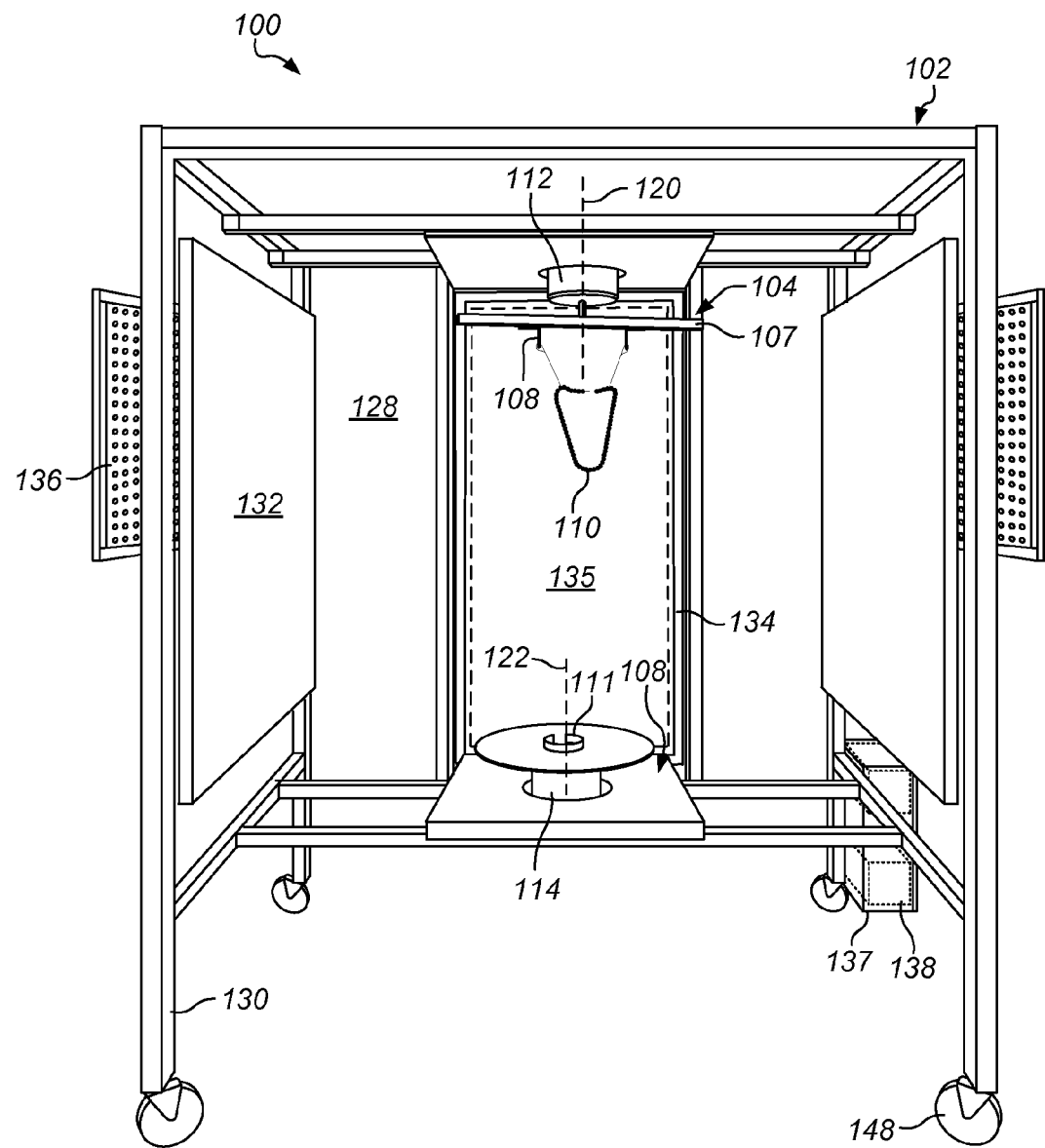
FIG. 1 illustrates a system for capturing images of objects that includes a lighted booth according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for acquiring images of an object from multiple directions are disclosed. According to one embodiment, a system for capturing images of an object includes an image capture booth, one or more lights coupled to the image capture booth, a platter coupled to the image capture booth, and a hanger coupled to the image capture booth. The image capture booth includes panels that enclose a space for imaging objects. The lights illuminate at least a portion of the space. The platter and the hanger each support objects for imaging of the objects in the image capture booth.

According to one embodiment, an image capture booth includes a frame and one or more illumination panels coupled to the frame. The illumination panels enclose a space for capturing images of objects in the image capture booth. The illumination panels are adjustable relative to the space.

According to one embodiment, a system for capturing images includes an image capture booth, one or more object supports coupled to the image capture booth, a camera, and a camera support. The illumination panels enclose a space for imaging objects. The camera can capture images of the objects on the object supports in the booth.

According to one embodiment, a method of capturing images of an object includes positioning an image capture booth having one or more panels, one or more lights, and one or more object supports coupled to one another in proximity with one or more cameras. The panels or lights are adjusted relative to the object supports. Images of an object are captured in the image capture booth.

As used herein, "base" includes any element or combination of elements that holds or supports another element or elements.

As used herein, "coupled to" includes a direct connection or an indirect connection. Elements may be coupled to one another in any of various manners, including a fixed connection, pivoting connection, sliding connections, or combinations thereof.

As used herein, "camera" means any device that can acquire or capture an image of an object.

As used herein, "drive system" means any system that can move, rotate, translate, or position an element or combination of elements. A drive system may include one or more of any of various drive elements, such as rollers, wheels, rods, pulleys, gears, belts, or sprockets. As one example, a platter drive system may include a motor-driven turntable disc. As another example, a platter drive system may include a set of rollers that can be driven to rotate a platter in a horizontal plane about a vertical axis.

As used herein, "hanger" means any element or combination of elements from which an object can be hung or suspended. A hanger may be round, square, or another shape. Examples of hangers include hooks, rods, pins, bars, beams, plates, rings, or discs.

As used herein, "illumination panel" means a panel that can provide illumination of objects. In some embodiments, light for an illumination panel is provided by a backlight behind a translucent panel, such as a vellum sheet.

As used herein, "image" includes still images and moving images. In some embodiments, an image includes video.

As used herein, "image capture booth" means an enclosure, frame, or other structure that at least partially encloses or sets off a space in which images of an object can be captured. The space in an image capture booth may be enclosed by way of panels, walls, or other structures or elements. In some embodiments, an image capture booth encloses a space by way of backlit panels.

As used herein, "object support" means any element or combination of elements that can physically support an object. An object support may include, for example, a platter, a hanger, a clamp, or a clip. An object support may be round, square, or another shape.

As used herein, "opposed", or "opposite", in the context of the relationship between a camera and another element (such as a background panel) relative to a target zone, means that the element is positioned such that the camera images at least a portion of the element when a shot is taken while the camera is pointed at the target zone. For example, a background panel may be opposed to a camera if at least a portion of the background panel is below the target zone when the camera is directly above the target zone and pointed straight down toward the target zone.

As used herein, a "panel" may be flat, arcuate, curved, concave, convex, irregular, a combination thereof.

As used herein, "platter" means any element or combination of elements on which an object can be rested. A platter may be, for example, a plate, a disc, a block, a grid, a sheet, a box, or a tray. A platter may be round, square, or another shape. In certain embodiments, a platter may have raised sides or a top, such as a box having transparent sidewalls.

FIG. 1 illustrates a system for capturing images of objects that includes a lighted booth according to one embodiment. Booth system 100 includes image capture booth 102, hanger 104, and platter 106. Hanger 104 and platter 106 are coupled to image capture booth 102. Hanger 104 includes hanger bar 107 and clips 108. Hanger 104 and platter 106 may serve as object supports for various objects to be imaged in booth system 100. For example, necklace 110 may be suspended on hanger 104, and bracelet 111 may be placed on platter 106. Images may be taken of the objects in booth system 100 using, for example, a camera mounted on a stand in front of booth system 100 (the camera is omitted from FIG. 1 for clarity).

In some embodiments, object supports are coupled for movement, such as rotation, translation, or a combination of both. For example, in the embodiment shown in FIG. 1, booth system 100 includes hanger drive system 112 and platter drive system 114. Hanger drive system 112 is coupled to hanger bar 107 of hanger 104. Hanger drive system 112 may be operated to rotate hanger bar 107 on rotation axis 120. In some embodiments, axis 120 is a vertical axis. The orientation of platter 106 may be controlled to rotate objects on platter 106 so that images can be captured from multiple directions (for example, front, left side, right side, back).

Platter drive system 114 is coupled to platter 106. Platter drive system 114 may be operated to rotate platter 106 on rotation axis 122. In some embodiments, axis 122 is a vertical axis. The orientation of platter 106 may be controlled to rotate objects on platter 106 so that images can be captured from multiple directions (for example, front, left side, right side, back).

Image capture booth 102 defines space 128 in which objects can be imaged. Image capture booth 102 includes frame 130, side panels 132, rear panel 134, and side lights 136. Side panels 132, rear panel 134, rear lights 135, and side lights 136. Side panels 132 and rear panel 134 may be translucent. Side panels 132 and rear panel 134 may serve to diffuse light projected from behind the panels. For example, side panels 132 may diffuse light emitted from side lights 136, and rear panel 134 may diffuse light projected from rear light 135. Power supply enclosure 137 houses power supply units 138. Power supply units 138 may supply power to light arrays for booth 102 (such as rear light 135, side lights 136, hanger drive system 112, and platter drive system 114.

Figure 2:
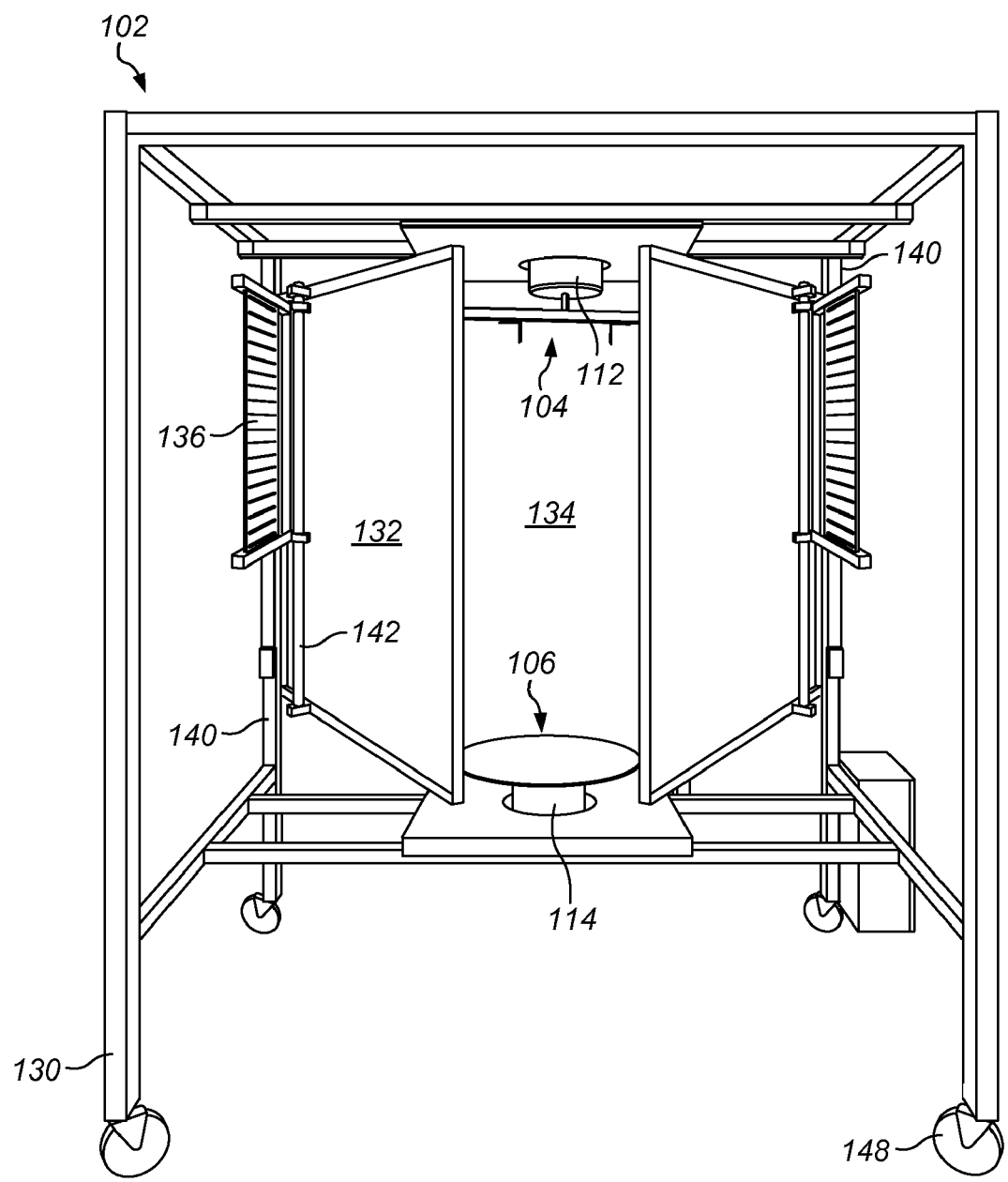
FIG. 2 illustrates an embodiment of an image capture booth in which side panels have been adjusted inwardly.

In some embodiments, panels and lighting elements in an image capture booth are adjustable. In certain embodiments, panel and lights are adjustable independently adjustable with respect to one another. FIG. 2 illustrates an embodiment of an image capture booth in which side panels have been adjusted inwardly (for example, relative to the position of the side panels and light elements shown in FIG. 1). Side panels 132 can be hinge-mounted on frame member 140 of frame 130 such that the front edges of side panels 132 may be swung inwardly relative to platter 102 and hanger 104 and platter 106. Side lights 136 may be coupled to bars 142 on side panels 132 such that side lights 136 may be swung inwardly. Side lights 136 may be movable on bars 142 to vertically adjust the height of side lights 136 upward or downward relative to side panels 132. In certain embodiments, a locking mechanism is provided to lock side lights 136 at a desired height. The angle of side lights 136 may be separately adjustable from the angle of side panels 132. The spacing between side lights 136 and side panels 132 may be adjusted (for example, by swinging side lights 136 on bar 142). In some embodiments, the height of side lights 136 and side panels 132 are independently adjusted to achieve a desired distribution of light in image capture booth 102.

In certain embodiments, lighting may be coupled directly to a frame, rather than to diffusion panels in a booth. For example, side lights 136 may be coupled directly to frame member 140 instead of, or in addition to, bars 142 on side panels 132.

In some embodiments, lighting elements of an image capture system are integrated with object support elements. In the embodiment shown in FIG. 2, for example, platter 104 and hanger 106 are integrated into a unit with and lighting arrays of booth 102 by way of common frame 130. In some embodiments, system lighting, background, and object support elements for a system can be moved as a unit. For example, frame 102, side panels 132, rear panel 134, rear lights 135, side lights 136, hanger 104, platter 106, and power supply units 138 may be rolled as a unit on castors 148 to a desired location. In other embodiments, a booth may be mounted a skids or rails to facilitate positioning of the booth.

In some embodiments, objects supports are coupled to allow translation of the object supports within a booth. For example, hanger 104 and/or platter 106 may be coupled to allow up and down translation in booth 102. As another example, hanger drive system 112 and/or platter drive system 114 may be coupled to allow side-to-side translation on frame 130.

Figure 3:
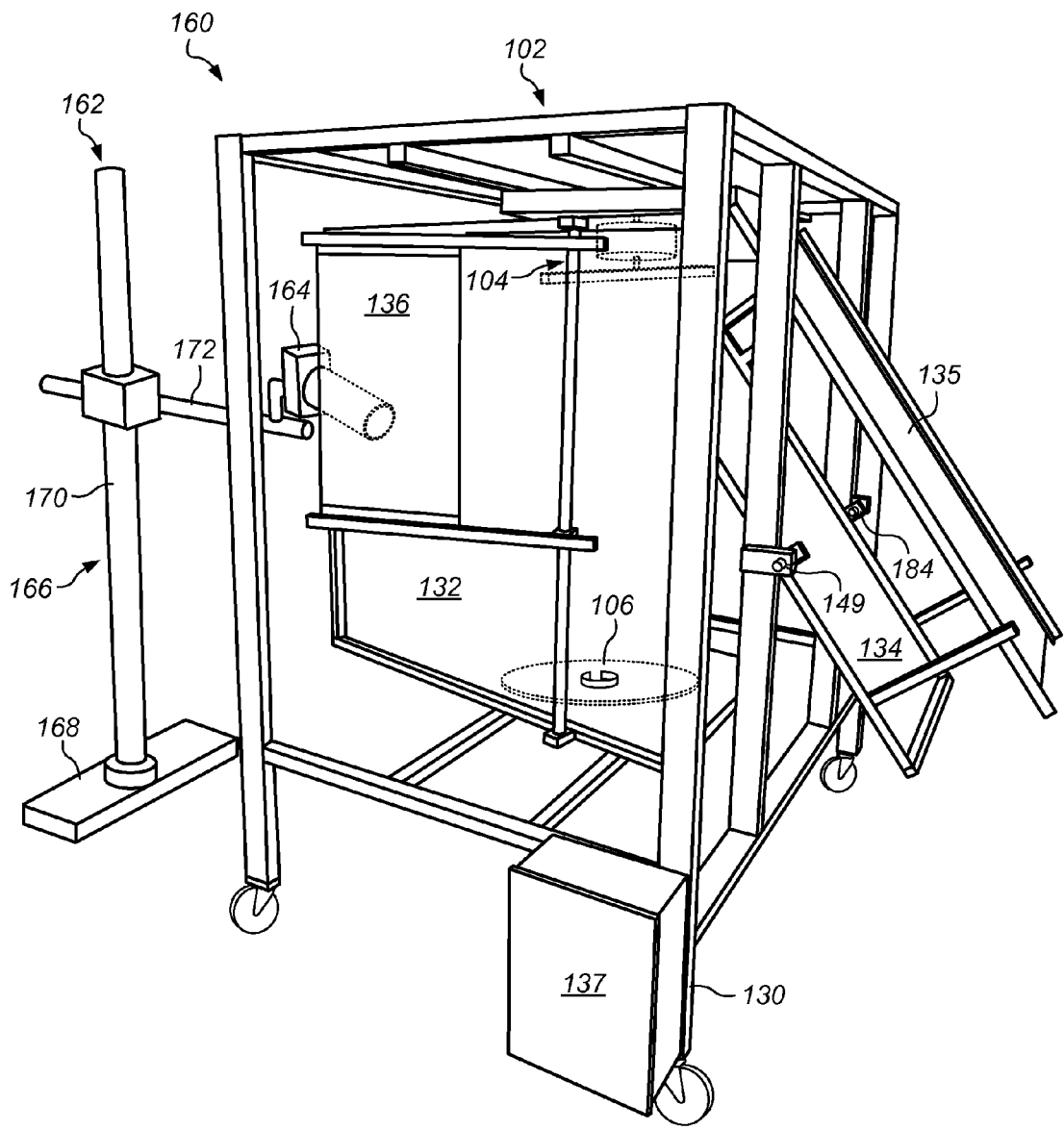
FIG. 3 illustrates one embodiment of a camera system positioned for capturing images of objects in a booth system.

In some embodiments, an image booth system is used in conjunction with a separately mounted camera. FIG. 3 illustrates one embodiment of a camera system positioned for capturing images of objects in a booth system. Image capture system 160 includes booth system 100 and camera system 162. Camera system 162 includes camera 164 and camera mount 166. Camera mount 166 includes base 168, column 170, and arm 172. Camera 164 is mounted on arm 172. Camera mount 166 may be adjusted to control the position and orientation of camera 164. For example, camera 164 may be adjustable relative to arm 172, and arm 172 may be adjustable on column 170.

To capture images of a bracelet 111 on platter 106, camera 164 may be positioned near the front of image capture booth 102 and pointed at bracelet 110. Camera 164 may be adjusted on arm 172 to a suitable position and orientation for capturing images of bracelet 111. Side panels 132 and side lights 136 may be swung inwardly such that side lights 136 provide illumination of bracelet 111 for images taken with camera 164. In certain embodiments, separate lights may be provided on or next to camera 164 instead of, or in addition to, side lights 136.

In some embodiments, platter drive system 114 includes a motor to drive platter 106. Platter drive system 114 may be operated in a coordinated manner, as a turntable, to drive platter turn platter 106. By selectively rotating platter 106, bracelet 111 may be rotated in a horizontal plane such that any of the various surfaces of bracelet 111 (front, back, side) faces a desired direction. In some embodiments, video is captured using camera 164 as platter 106 is rotated to alter the view of bracelet 111.

In some embodiments, panels of an image capture booth are adjustable in an upward and downward direction relative to object supports for a system. As shown in FIG. 3, for example, rear panel 134 and rear lights 135 can be tilted downwardly with respect to platter 106. Rear panel 134 and rear lights 135 are coupled to one another by way of spacer bars 182. Rear panel 134 is coupled to frame 130 at joint 184. Rear panel 134 may be rotated on joint 134 relative to frame 130. When rear panel 134 is rotated to tilt downwardly (such as shown in FIG. 3), rear lights 135 may illuminate objects on platter 106 more effectively than when rear panel 134 and rear lights 135 are in a vertical position. In some embodiments, the light projected through a downwardly tilted rear panel 134 may serve as a key light (for example, the primary light) for images of an object on platter 106.

In some embodiments, a booth includes devices for locking the positions of some or all of the panels or lights. For example, as shown in FIG. 3, image capture booth 102 includes locking clamp 149. Locking clamp 149 may be used to lock rear panel 134 and rear lights 135 at a desired angle (for example, tilted 30 degrees downward) relative to frame 130. In certain embodiments, the position or orientation of a light or panel is controlled automatically, such as by a motor or an actuator controlled by a microprocessor.

A booth may be used to capture images any of various items. In some embodiments, a system is used to capture images of jewelry. In some embodiments, a system is used to capture images of a watch. Examples of other objects that can be imaged include handbags, purses, shoes, hats, luggage, photo frames, food packages, and tools.

Figure 4:
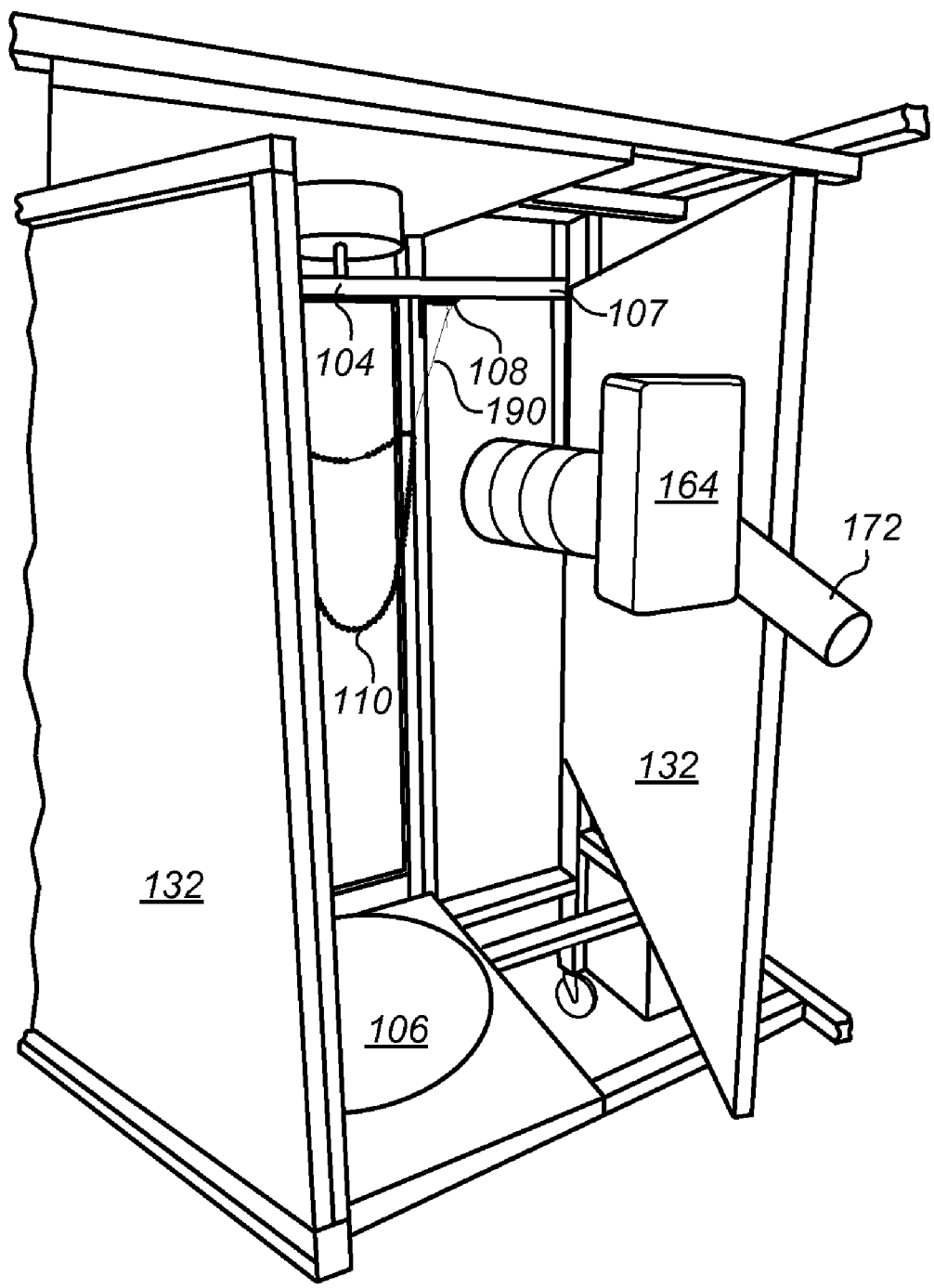
FIG. 4 illustrates one embodiment of a system arranged to capture images of a necklace.

FIG. 4 illustrates one embodiment of a system arranged to capture images of a necklace. Necklace 110 is suspended on hanger 104. Crossbar 107 may allow mounting of clips 108 in different locations along the along the length of crossbar 107. In one embodiment, a cross bar includes a series of slots or holes in which clips 108 can be coupled. In another embodiment, clips 108 are mounted on a rail on crossbar 107 that allows clips 108 to be slid along the rail to a desired position on crossbar 107. Necklace 110 may be attached to clips 108 of hanger 104 by way of transparent line 190. Transparent line 190 may be, for example, nylon fishing line. The use of transparent line 190 may reduce the presence of mounting elements in the images of necklace 110.

Camera 164 is positioned near the front of booth 102 and pointed at necklace 110. Camera 164 may be adjusted on arm 172 to a suitable position and orientation for capturing images of necklace 110. Side panels 132 and side lights 136 (not shown in FIG. 4 for clarity) may be swung inward such that side lights 136 provide illumination of necklace 110 for images taken with camera 164. In certain embodiments, separate lights may be provided on or next to camera 164 instead of, or in addition to, side lights 136.

During capture of images of necklace 110 on hanger 104, rear panel 134 may be opposed to the position of the camera relative to necklace 110. As such, rear panel 134 may serve as a background panel for the image. In some embodiments, panels of a booth may provide a consistent background for images captured in a booth.

In some embodiments, objects on two or more different object supports are imaged at the same time. For example, camera 164 may capture one or more images that include objects on both hanger 104 and platter 106. In certain embodiments, the motion of two or more object supports is synchronized to coordinate the view of the objects as viewed from a camera.

Although in the embodiments shown in FIGS. 1-4, side panels swing inward and outward on a hinged connection, panels of a booth may in various embodiments be mounted for other types of adjustment. For example, panels and lights on the sides and/or rear of a booth may be mounted on rails such that the panels and lights can translate up, down, in, out, or any other direction relative to the objects to be imaged. In certain embodiments, side panels and/or side lights may tilt up or down.

Figure 5A:
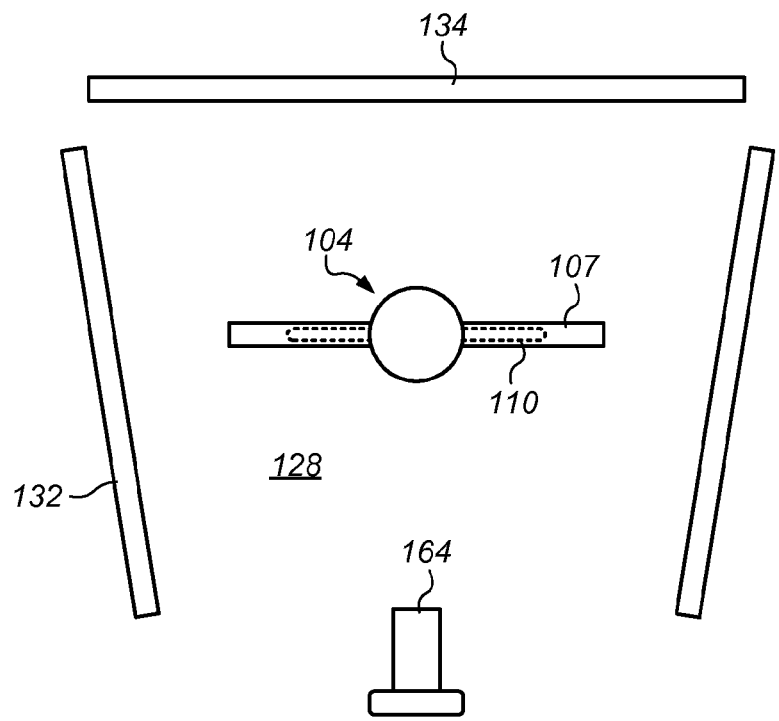
FIGS. 5A and 5B illustrate different positions of a hanger for holding objects to be imaged in an image capture booth.
Figure 5B:
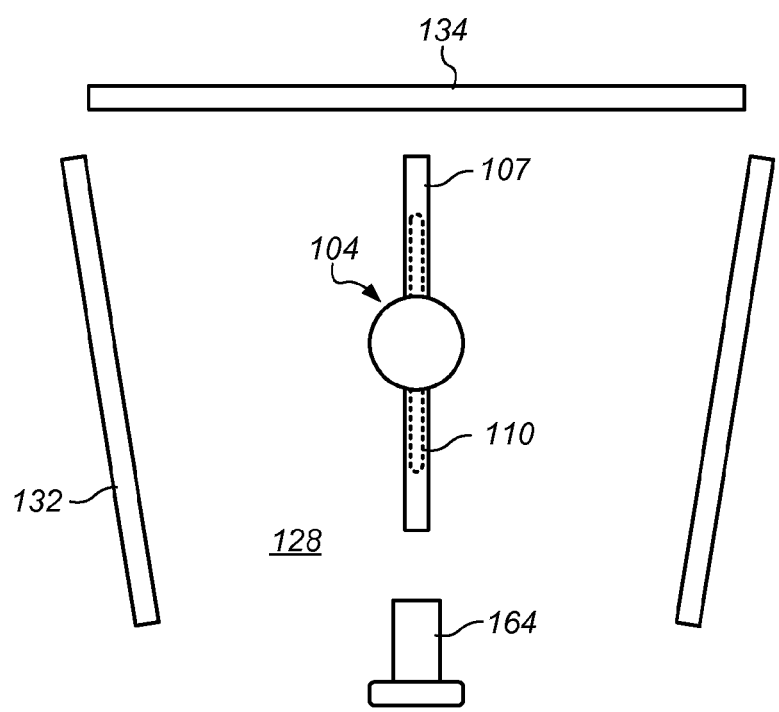

In some embodiments, an object support is moved from one position to another to capture images of an object on the object support. FIGS. 5A and 5B illustrate different positions of a hanger. In FIG. 5A, hanger drive system 112 is used to position hanger 104 such that hanger bar 107 is oriented with its long direction in a side-to-side orientation. The orientation shown in FIG. 5A may present a front view of necklace 110 to camera 164. In FIG. 5B, hanger drive system 112 is used to position hanger 104 such that hanger bar 107 is oriented with its long direction in a front-to-back orientation. The orientation shown in FIG. 5B may present a side view of necklace 110 to camera 164.

Although two positions of a hanger are shown in FIGS. 5A and 5B, an object support may, in various embodiments, be adjusted to any number of different positions (for example, to capture images of the rear of the object, left side of the object, etc.).

In some embodiments, images captured of an object include video images. In some embodiments, an object support may be moved while video is being captured to obtain video of the object in motion. For example, hanger drive system 112 may be used to rotate hanger 104 at a constant angular velocity as video is captured of necklace 110.

In some embodiments, a system is operated to capture still images and video of an object. In certain embodiments, still images and video are captured without changing the setup of a shoot. For example, with the lights and panels arranged as shown in FIG. 4, camera 164 may sequentially capture still images of necklace 110, then video of necklace 110, then more still images of necklace 110. In some embodiments, video may be taken while an object support is operated to move an object with respect to the camera (for example, rotate an object on a turntable).

Side lights 136 may be positioned behind side panels 132 and directed toward the back surface of side panels 132. Side panels 132 may serve as diffusers to diffuse light from side lights 136 into space 128. Rear lights 135 may be positioned behind rear panel 134 and directed toward the back surface of rear panel 134. Rear panel 134 may serve as a diffuser to diffuse light from light 135 into space 128.

In one embodiment, side panels 132 and rear panel 134 are made of a frosted acrylic glass. In another embodiment, side panels 132 and rear panel 134 include a clear acrylic glass base panel with a vellum covering. Side lights 136 may be spaced a few inches behind side panels 132. Rear light 135 may be spaced a few inches behind rear panel 134. Having a space between light and panels may produce a relatively even light in the background of product images.

As shown in FIGS. 1-3, side panels 132 and rear panel 134 may be flat. Panels of an image capture system may, however, have any of various forms, shapes, and curvatures, including arcuate, spherical, convex, concave, irregular, or combinations thereof.

Side lights 136 and rear light 135 may be any of various suitable light-producing devices. In one embodiment, side lights 136 and rear light 135 are arrays of light emitting diodes. Side lights 136 and rear light 135 may emit light in any color. In one embodiment, side lights 136 and rear light 135 emit white light having RGB coordinates of 255/255/255. In another embodiment, side lights 136 and rear light 135 may be a gray light. In certain embodiments, the color of side lights 136 and/or rear light 135 may be varied (for example, by or through control unit 118). For example, side lights 136 may be automatically adjusted from a white light to a green light. In certain embodiments, the intensity of side lights 136 and/or rear light 135 may be varied (for example, by or through a control system). In some embodiments, one or more lights in a booth may include gas discharge lamps, such as hyrdagyrum medium-arc iodide lamps. In some systems, the light levels of lights for a booth are variable (for example, by controlling the voltage to the lamps).

In certain embodiments, one or more panels of a booth may not be backlit at all. In certain embodiments, one or more panels of a booth are opaque.

Figure 6:
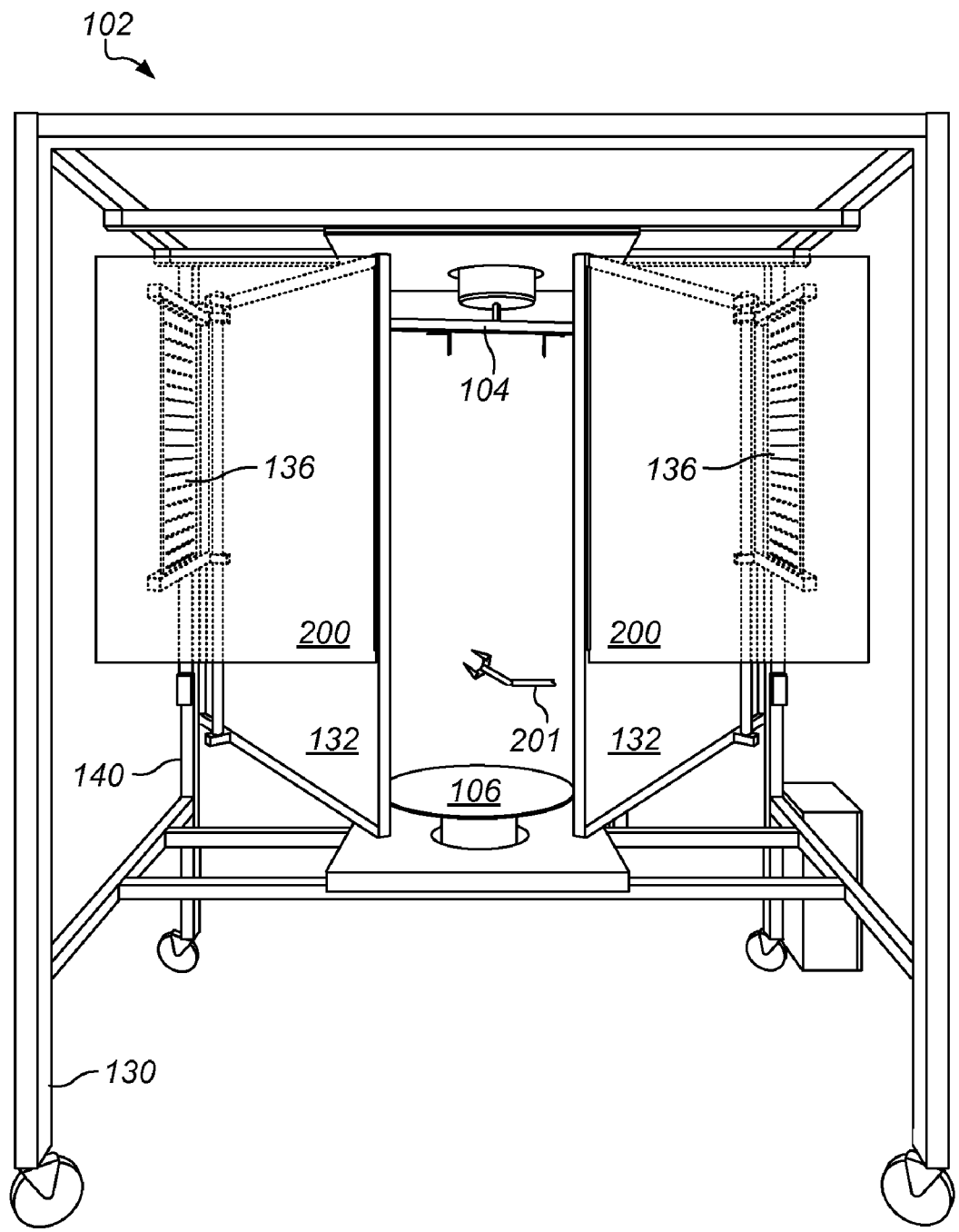
FIG. 6 illustrates one embodiment of an image capture booth including cards for blocking side light.

In some embodiments, an image capture booth includes cards for blocking and/or reflecting light. FIG. 6 illustrates one embodiment of an image capture booth including cards for blocking side light. Image capture booth 102 includes side light blocking cards 200. Side light blocking cards 200 are coupled to the front edges of side panels 132. In some embodiments, side light blocking cards 200 are coupled to side panels 132 by way of a hinged connection. Side light blocking cards 200 may block light from being cast into the area in front of image capture booth 102. In some embodiments, the rear surface of side light blocking cards 200 is reflective. Light from side lights 136 may be reflected off the rear surface of side light blocking cards 200 and diffused through diffuser side panel 132 to illuminate objects in image capture booth 102.

In some embodiments, an object to be photographed may be automatically transported to and/or from a target zone. For example, a transport device may be used to deliver an object, such as a watch or necklace, to an object support. Suitable mechanisms for transporting an object to an object support may include robotic arms, conveyor belt systems, motorized carts, and/or combinations thereof. For example, system 102 shown in FIG. 6 includes robotic arm 201 (supporting apparatus for robotic arm 201 is omitted for clarity). In some embodiments, a transport device may remove an object from an object support after images of the object have been captured in an image capture booth. In some embodiments, an object to be photographed may be automatically transferred to or from conveyor belt onto a turntable by a transfer mechanism. In one embodiment, the transfer mechanism is a robotic arm that transports a platter carrying the object to the turntable system Although in the embodiment shown in FIGS. 1-3, booth 102 has panels on both sides, in other embodiments, one or more sides of a booth may be open. In addition, all or part of a back side, front side, or top of a booth may be open or partially open.

Figure 7:
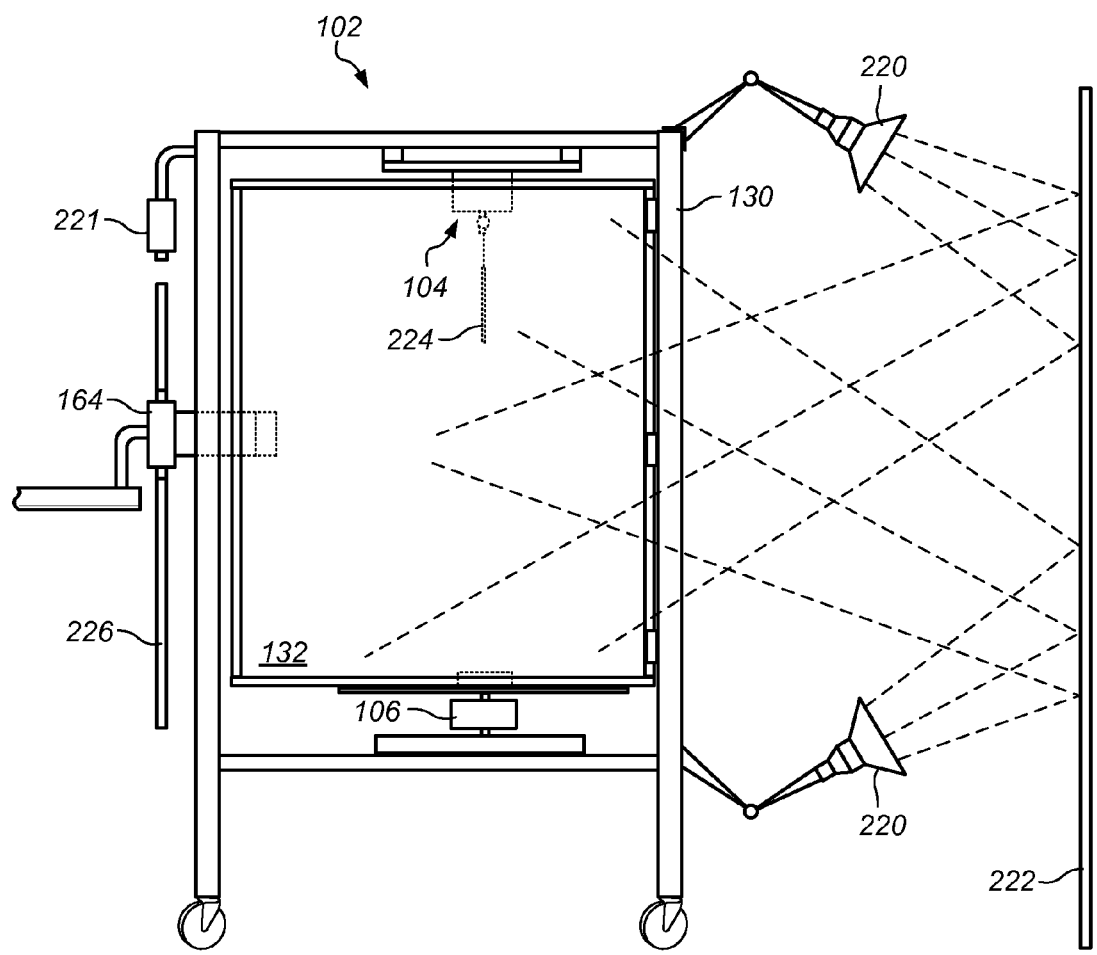
FIG. 7 is a schematic diagram illustrating back lighting of an object using an external reflective panel.

In some embodiments, an object in an image capture booth may be illuminated by light from a reflective panel in or next to the image capture booth. FIG. 7 is a schematic diagram illustrating back lighting of an object using an external reflective panel. Lights 220 are attached to frame 130 of image capture booth 102. Lights 220 may cast light on reflective panel 222.

Light may be reflected from reflective panel 222 and onto the back of object 224 in image capture booth 102. Camera 164 may capture images of object 224. In certain embodiments, a reflective panel, such as reflective panel 222, may be placed at the front of a booth instead of, or in addition to, at the rear of the booth. In some embodiments, reflective panel 222 is attached to a wall of a room. In other embodiments, reflective panel 222 is free standing. In still other embodiments, reflective panel 222 is attached to a structural element of booth 102 (such as frame 130).

At the front of booth 102, camera 164, front reflective panel 226, and front light 227 are provided. Front light 227 may be used to provide additional lighting of object 224.

In some embodiments, a control system automatically controls image operations of an image capture system or use of the images. In some embodiments, an image capture system automatically controls positioning of objects in the image capture system. In some embodiments, an image capture system automatically controls some or all of the camera operations for the system. In one embodiment, a master control system controls lights (such as light intensity) and the object support positioning mechanisms (for example, rotational speed and direction of platter and hanger turntables).

In certain embodiments, a control system automatically controls a transport device (such as a robotic arm) to deliver or remove objects from object supports in an image capture booth.

In some embodiments, a camera, lights, illumination panels, and object support drive systems, a combinations thereof, are operated by a remote control device (such as a wireless remote device).

Figure 8:
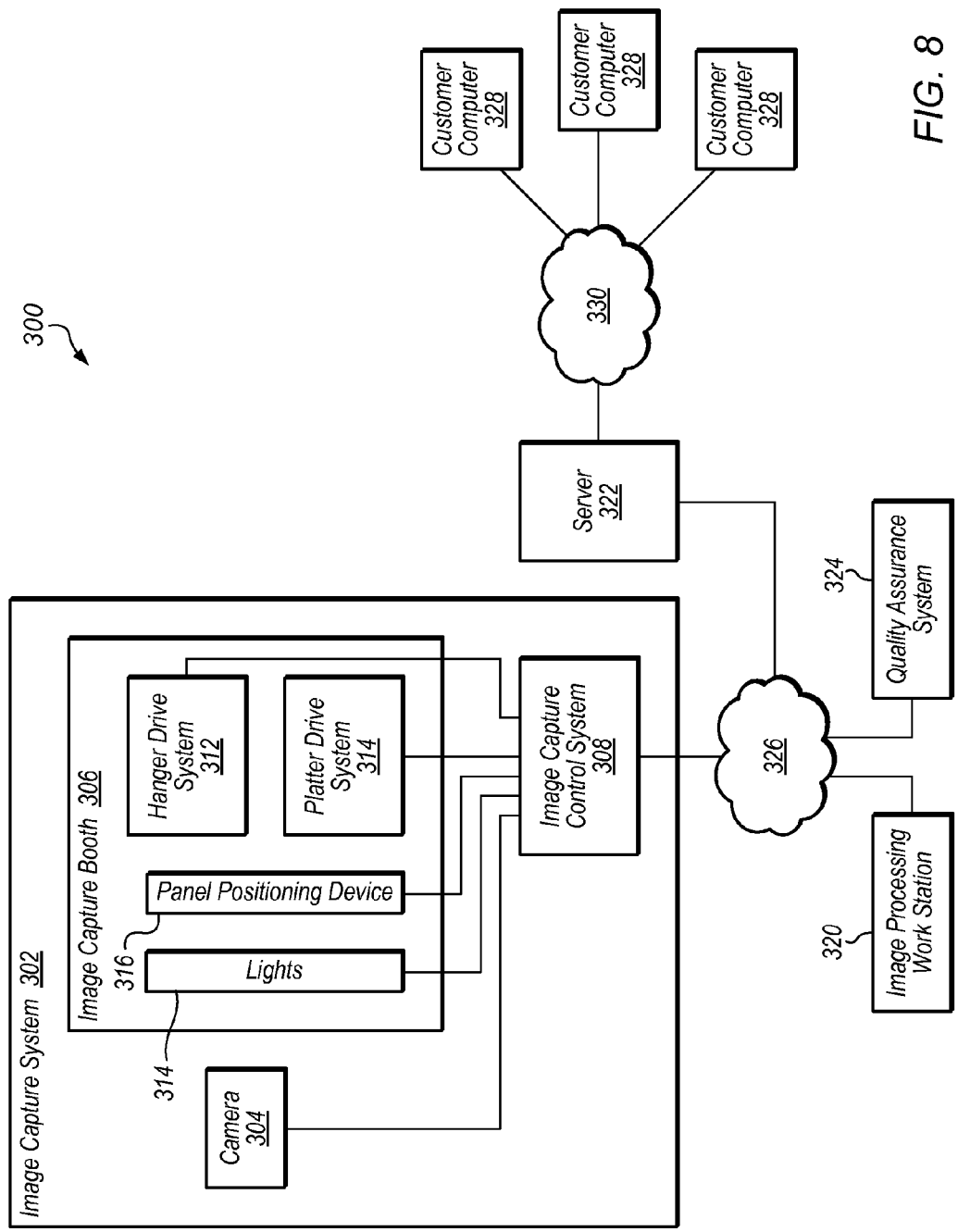
FIG. 8 illustrates one embodiment of an electronic commerce system that includes an automatic image capture system.

FIG. 8 illustrates one embodiment of an electronic commerce system that includes an automatic image capture system. Electronic commerce system 300 includes image capture system 302. Image capture system 302 includes camera 304, image capture booth 306, and image capture control system 308. Image capture control system 308 is coupled to hanger drive system 310, platter drive system 312, lights 314, and panel positioning device 316, and camera 304. In some embodiments, image capture control system 308 includes at least one programmable logic controller. Image acquisition control system 308 may control imaging operations in image capture system 302. For example, image acquisition control system 308 may control hanger orientation, platter orientation system, camera operations and settings, light settings, and panel position.

In some embodiments, image acquisition control system 308 synchronizes motion between platter drive system 312 and hanger drive system 314. In some embodiments, image acquisition control system 308 synchronizes camera operations (such a snapping the shutter) with the orientation or position of platter drive system 312, hanger drive system 314, or both.

In some embodiments, one or more settings on camera 304 are automatically controlled. For example, shutter speed, zoom, aperture, may be automatically adjusted. Control signals may be transmitted to a camera and/or other systems in the photographing machine by way of wired signals (such as by USB) or wireless signals (such as by wi-fi). In some embodiments, a camera includes an automatically controlled zoom lens.

In some embodiments, an image capture system is integrated with systems for carrying out product sales. For example, in the embodiment shown in FIG. 8, image acquisition control system 308 is coupled to image processing workstation 320, retail server 322, and quality assurance system 324 over network 326. Retail server 322 may serve customers operating customer computers 328 over network 330. In one embodiment, network 330 is the Internet.

In image capture system 302, imaging operations in may be set up or conducted. Image processing workstation 320 may be used for post-processing such as cropping and line removal for images acquired with image capture system 302. Processed images may be screened in quality assurance system 324, then uploaded to retail server 322 for use by customers in evaluating products for purchase from the seller.

Figure 9:
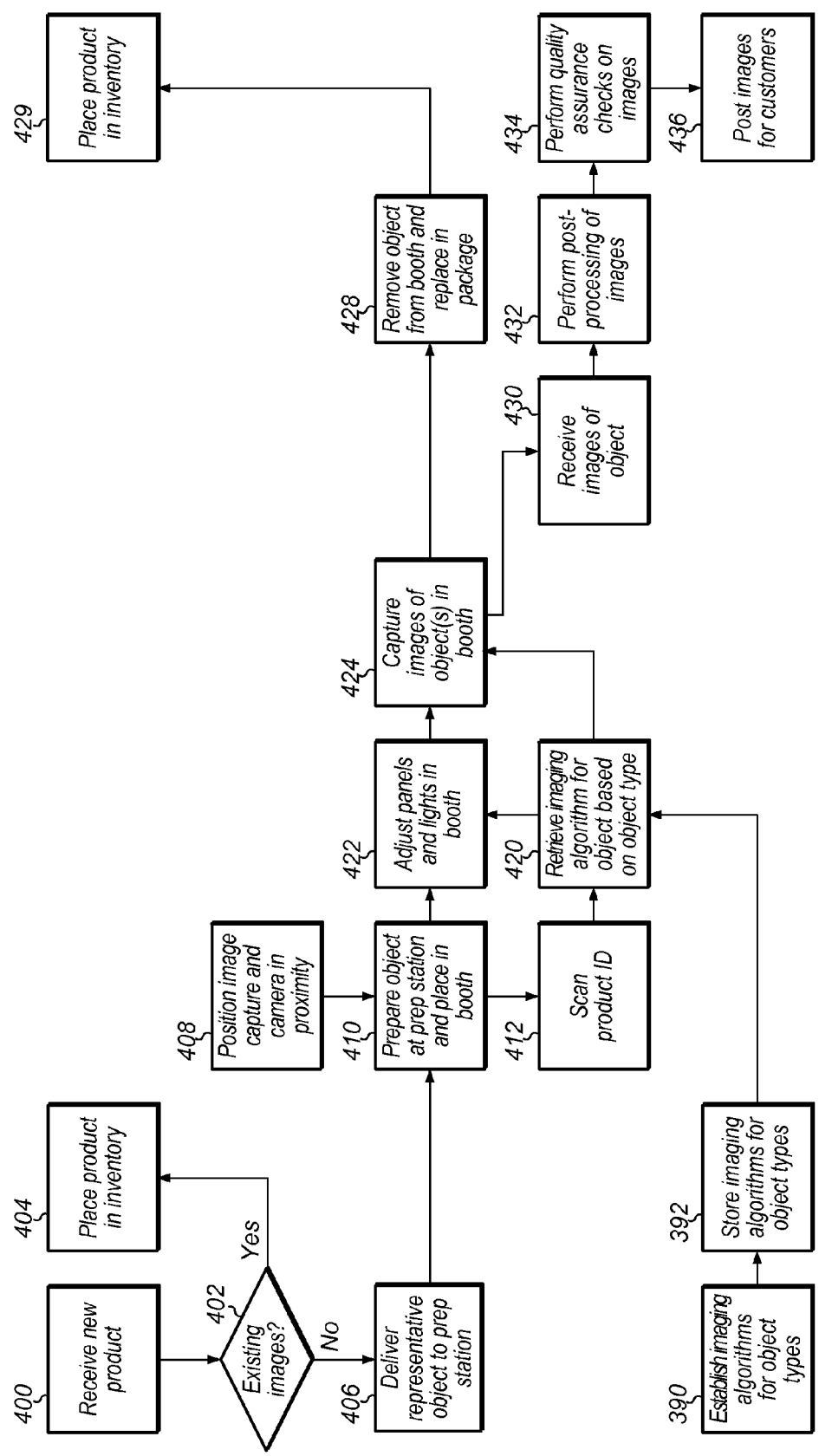
FIG. 9 illustrates imaging set up, acquisition, processing, and use of images of products for selling the products according to one embodiment.

FIG. 9 illustrates imaging set up, acquisition, processing, and use of images of products for selling the products according to one embodiment. Any or all of the steps may be performed automatically (by image capture control system 308 shown in FIG. 8, for example), manually, or a combination thereof. Although the workflows in FIG. 9 are described for a single product, the processing may in some embodiments be performed for multiple products in serial fashion (one product after another in a continuous or batch process, for example), multiple products in parallel fashion (with two or more image acquisition systems operating simultaneously, for example), or both.

At 390, an imaging algorithm may be established for each of one or more object types or classes. The imaging algorithm for an object type or class may be based on the type of product (bracelet, necklace, watch, purse, hat, music player, etc.), characteristics of the object's appearance (such as color, gloss, or size), sales parameters (such as a sales channel for the product, or whether the product is a discount item), or on any of various other characteristics. The imaging algorithm may specify attributes of an imaging sequence, including the number and direction of each of shot, main light settings, background light settings, background color settings, camera settings, background, and various other aspects of the imaging process. Each type or class of object may have different imaging algorithm. For example, the imaging algorithm for a dress shoe may call for images from seven specified directions (top, front, back, side, etc.) with certain lighting and zoom settings, the imaging algorithm for a plate of china may call for a single image taken from directly above the plate, with different lighting and zoom settings, and so on. In some embodiments, product identifiers, such as a bar code, are stored in association with the object types. For example, the bar code for a particular bracelet may be associated with object type=bracelet/gold/shiny.

At 392, the established imaging algorithms may be stored, for example, in a computer database, for subsequent retrieval and use during image acquisition.

At 400, a product to be sold may be received by a seller. The seller may be, in one example, an electronic commerce retailer. At 402, a determination is made of whether the seller already has images of the product available. If the seller already has images of the product available, the received products may be placed into the seller's inventory at 404. If the seller does not already have images of the product, a representative object for the product may be delivered (typically, in the package for the product, if any) to an imaging prep station at 406. For products that include two or more items, the representative object may be a representative item. For example, for a set of china, a representative item may be one plate in the set of china. A representative object may also be an item of a product that is the most aesthetically significant item.

At 408, an image capture booth and one or more camera may be positioned in proximity with one another. For example, an image capture booth may be rolled into position next to a camera mounted on mono column support in an imaging studio. The booth may include panels, lights, object supports (such as a hanger and a platter), and power supply units mounted on a common frame.

At 410, the representative object for the product is prepared for imaging. Preparation of an object may include various steps, depending on the nature of the product. In the case of a necklace, preparing the object may include removing the necklace from a box, placing a jewelry item on a chain, etc. Once the object has been prepared, the object may be placed on an object support in the image capture booth.

At 412, a product identifier, such as a bar code, for the product is scanned. The product identifier may be located on the product itself, or on or in the product package. In addition, an identifier (such as a bar code) on the object support on which the object is placed may be scanned. In a computer system, the scanned identifier for the object support may be associated with scanned identifier for the product.

At 420, an algorithm for imaging the object may be retrieved (for example, from the imaging algorithms that were established at 390 and stored at 392). As discussed above, the algorithm may be based on the type or class for the object (necklace, bracelet, etc.). In one embodiment, from the bar code scanned at 412 from the object to be imaged, the imaging algorithm for the object type associated with the bar code may be selected.

At 422, lights and panels may be adjusted for imaging of the object. In some embodiments, lights and panels are adjusted based on the imaging algorithm for the object.

At 424, the object may be imaged based on the imaging algorithm. In certain embodiments, data from sensors in the image capture system, such as light levels, may be recorded. Images captured may include still photographs, video, or both. Object supports may be positioned and oriented before or during the shoot to obtain images of the object from the desired directions. In some embodiments, the position and/or orientation of object supports are automatically controlled based on an imaging algorithm for the object.

In some embodiments, an imaging sequence may include capturing images of two or more objects on different object supports. For example, a necklace may be placed on hanger in a booth and bracelet may be placed on a platter in the booth. An imaging algorithm may sequentially capture images of the necklace and the bracelet. In certain embodiments, one image may include two or more objects in a booth. For example, one image may include both an object on a platter and an object suspended above the platter on a hanger.

At 430, electronic data representing the images of the object may be received from the photographing machine, for example, at an image processing workstation. At 432, post-acquisition processing may be performed. Post-acquisition processing may include cropping, background removal, line removal, and straightening.

Automatic execution of a given algorithm using the same camera positions, lighting, and camera settings, may result in images that are consistent from object to object. As a result of the consistency in images between different photo shoots and/or different objects, cropping, background removal, line removal, and/or straightening may in some cases be performed automatically. For example, on a particular shot (e.g., a front view) in an imaging algorithm for given object type (e.g., a necklace), it may be determined that a particular undesired feature (such as the edge of a rail or a shadow) appears in the same place on the resulting image every time the algorithm is executed. Information specifying the location of such an undesired feature may be stored in association with the imaging algorithm. This information may be retrieved during post-processing and used to automatically remove the undesired feature from the image. In certain embodiments, metadata associated with an acquired image, such as data relating to the object type (e.g., data relating to the physical characteristics of a product) or a particular photo shoot (such as light level data taken from sensors in the photographing machine), may be used in post-acquisition processing of an image.

At 434, quality assurance checks are performed on the images acquired for the object. At 436, the object may be posted for review by customers, such as on a website for making retail purchases.

In certain embodiments, an image capture system includes two or more cameras. For example, an image capture system may include one camera for taking images of an exterior of an object (such as the exterior of a purse) and a second camera for taking images of the interior of the object (such as the interior of the purse). Each of the cameras may have a different configuration. The two or more cameras may be arranged, for example, side-by-side, or on a rotating carousel. The image capture system may move an active camera, an object support, or both, as needed to position and point the active camera at the object.

In certain embodiments, a camera system may be integrated with an image capture booth. For example, a camera with a camera positioning apparatus may be attached to frame 130 of image capture booth 102 shown in FIG. 1).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for capturing images of an object, comprising:
an image capture booth comprising one or more panels configured to at least partially enclose a space for imaging objects;
one or more lights coupled to the image capture booth, wherein at least one of the lights is configurable to illuminate at least a portion of the space;
a platter coupled to the image capture booth, wherein the platter is configurable to support objects for imaging of the objects in the image capture booth; and
a hanger rotatably coupled to the image capture booth, wherein the hanger is configurable to couple with an object so that the object is suspended from the hanger, wherein the hanger is configured to rotate the object in the image capture booth about an axis passing through the object while the object is suspended from the hanger.

2. The system of claim 1, wherein at least one of the panels comprises a diffuser, wherein at least one of the lights is configured to cast light through the diffuser to illuminate objects in the image capture booth, wherein the at least one panel comprising the diffuser is adjustable with respect to at least one of the platter or the hanger.

3. The system of claim 1, wherein the hanger is configured to rotate about a substantially vertical axis.

4. The system of claim 1, further comprising a drive system coupled to the hanger, wherein the drive system is configured to rotate the hanger about the axis passing through the object.

5. The system of claim 1, further comprising at least one mechanism configured to raise and lower the hanger.

6. The system of claim 1, wherein the platter and hanger are synchronized with one another.

7. The system of claim 1, further comprising one or more power supply units attached to the image capture booth, wherein at least one of the power supply units is configured to supply power to at least one of the one or more lights for the booth.

8. The system of claim 1, wherein the image capture booth comprises a frame, wherein at least one of the panels, at least one of the one or more panels, one or more of the one or more lights, the hanger, and the platter are coupled to the frame such that the system is moveable as a unit.

9. The system of claim 1, further comprising at least one card configured to block light emanating at the front of the image capture booth from at least one of the one or more lights.

10. The system of claim 1, wherein the hanger is configurable to rotate independent of rotation of the platter.

11. An image capture booth, comprising:
a frame;
one or more illumination panels, the illumination panels at least partially enclosing a space for capturing images of objects in the image capture booth,
wherein at least one of the illumination panels comprises at least one diffuser configured to diffuse light onto objects in the image capture booth; and
at least one light located outside of the space and configured to cast light through the diffuser into the space, wherein the at least one diffuser and the at least one light are commonly coupled to the frame and movable relative to the frame,
wherein at least one of the illumination panels is adjustable relative to the space.

12. The image capture booth of claim 11, wherein the image capture booth is configured to couple with at least one object support that is configurable to support objects in the image capture booth.

13. The image capture booth of claim 11, wherein the one or more panels of the image capture booth comprise a rear illumination panel, wherein the rear illumination panel is adjustable to tilt about a substantially horizontal axis and downwardly relative to the platter.

14. The image capture booth of claim 11, wherein the one or more panels of the image capture booth comprise at least one side illumination panel coupled to the frame, wherein the side illumination panel comprises a side light diffuser movably coupled to the frame and configured to diffuse light onto objects in the image capture booth, the image capture booth further comprising one or more lights movably coupled to the frame configured to cast light through the side light diffuser, wherein the side light diffuser and the one or more lights are both adjustable to swing about a substantially vertical axis inwardly or outwardly relative to at least one of the platter or the hanger.

15. The image capture booth of claim 11, wherein the at least one diffuser and the at least one light are independently adjustable on the frame with respect to one another in at least one direction.

16. The image capture booth of claim 11, wherein the at least a portion of the at least one light is vertically adjustable relative to the at least one diffuser.

17. The image capture booth of claim 11, wherein the spacing between at least a portion of the at least one light and the at least one diffuser is adjustable.

18. The image capture booth of claim 11, wherein at least a portion of the at least one light is vertically adjustable relative to the at least one diffuser, and wherein the spacing between the diffuser and the objects to be imaged and the spacing between at least a portion of the at least one light and the at least one diffuser are separately adjustable.

19. A system for capturing images, comprising:

an image capture booth comprising one or more illumination panels configured to at least partially enclose a space for imaging objects;

one or more object supports coupled to the image capture booth configured to support objects in the space in the image capture booth;

a camera configured to capture images of objects on at least one of the object supports in the image capture booth; and a camera support configured to support the camera device; and at least one object transport device configured to automatically transport at least one object to at least one of the object supports.

20. The system of claim 19, wherein the camera is configured to capture video of objects on at least one of the object supports in the image capture booth.

21. The system of claim 20, further comprising at least one drive system configured to move at least one of the object supports such that an object on the object support moves while the camera captures video of the object.

22. The system of claim 19, wherein the one or more object supports comprise a hanger configured to support objects for imaging of the objects in the image capture booth and a platter configured to support objects for imaging of the objects in the image capture booth.

23. The system of claim 22, wherein at least one of the platter or the hanger are synchronized with the camera.

24. The system of claim 19, further comprising a control system configured to control at least one operation or setting of at least one of the camera, at least one of the lights, or at least one of the object supports.

25. The system of claim 19, further comprising a control system configured to control the camera and at least one of the object supports, wherein the control system is configured to sequentially capture still photographs of objects on at least one of the object supports and video of objects on the at least one object support.

26. The system of claim 19, wherein the camera is mounted to a frame.

27. The system of claim 19, further comprising:

at least one reflecting panel outside the image capture booth, at least one light configured to cast light on the reflecting panel, wherein the reflecting panel is configured to reflect light from the light onto at least a portion of the object in the image capture booth.

28. A method of capturing images of an object, comprising:

positioning an image capture booth and one or more cameras in proximity with one another, the image capture booth comprising one or more panels, one or more lights, and one or more object supports coupled to one another, wherein the one or more object supports comprise a hanger;

suspending an object from the hanger;

adjusting at least one of the panels or at least one of the lights relative to at least one of the object supports;

rotating the hanger such that the object suspended from the hanger in the image capture booth rotates about an axis passing through the object and such that the view of the object from the camera changes; and capturing images of the object in the image capture booth from two or more different views.

29. The method of claim 28, further comprising sequentially capturing video of the at least one object while the at least one object is moving and capturing one or more still photographs of the at least one object.

* * * * *